United States Patent
Bharadwaj (10) Patent No.: US 10,671,554 B1
(45) Date of Patent: Jun. 2, 2020

(54) CREDIT BASED FLOW CONTROL MECHANISM FOR USE IN MULTIPLE LINK WIDTH INTERCONNECT SYSTEMS

(71) Applicant: Advanced Micro Devices, Inc., Santa Clara, CA (US)

(72) Inventor: Srikant Bharadwaj, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/271,371

(22) Filed: Feb. 8, 2019

(51) Int. Cl.
*G06F 13/20* (2006.01)
*G06F 13/40* (2006.01)

(52) U.S. Cl.
CPC .......... *G06F 13/20* (2013.01); *G06F 13/4027* (2013.01)

(58) Field of Classification Search
CPC .............................. G06F 13/20; G06F 13/4027
See application file for complete search history.

(56) References Cited

U.S. PATENT DOCUMENTS

| 5,859,837 | A | 1/1999 | Crayford | |
| 9,046,941 | B1 * | 6/2015 | Dropps | G06F 13/4291 |
| 2004/0218531 | A1 * | 11/2004 | Cherian | H04L 47/10 370/235 |
| 2008/0144670 | A1 * | 6/2008 | Goossens | G06F 15/78 370/503 |

* cited by examiner

Primary Examiner — Henry Tsai
Assistant Examiner — John B Roche
(74) Attorney, Agent, or Firm — Polansky & Associates, P.L.L.C.; Paul J. Polansky; Nathan H. Calvert (57) ABSTRACT

Flow control credit management is provided when converting traffic from a first parallel link width on a first link to a second parallel link width on a second link A current value is calculated for a variable flow control credit exchange rate (R) associated with the first and second links. A first flow control credit indicator is received on the second link, and a credit amount calculated based on the first flow control credit indicator and R. A second flow control credit indicator for the credit amount is then transmitted on the first link.

20 Claims, 5 Drawing Sheets

| Event | Flits Received (W) | Credits Received (X) | Exchange Rate Before | Action | Flits Sent (Y) | Credits Sent (Z) | Exchange Rate After (W-Z)/(Y-X) |
|---|---|---|---|---|---|---|---|
| 4 flits from router 120 | 4 | | | Sent 1 flit to router 110 | 1 | | 4 |
| 1 flit from router 120 | 5 | | 4 | Sent 1 flit to router 110 | 2 | | 2.5 |
| 1 credit from router 110 | 5 | 1 | 2.5 | Sent 2 credits to router 120 | 2 | 2 | 3 |
| 1 credit from router 110 | 5 | 2 | 3 | Sent 3 credits to router 120 | 2 | 5 | |

CREDIT BASED FLOW CONTROL MECHANISM FOR USE IN MULTIPLE LINK WIDTH INTERCONNECT SYSTEMS

STATEMENT REGARDING FEDERALLY SPONSORED RESEARCH OR DEVELOPMENT

This invention was made with Government support under the Pathforward Project with Lawrence Livermore National Security (Prime Contract No. DE-AC52-07NA27344, Subcontract No. B620717) awarded by DOE. The Government has certain rights in this invention.

BACKGROUND

Data interconnect links are used for signaling between different components of a chip, such as processors and memory controllers. Multi-processor systems often include a data interconnect fabric including many data interconnect links and routers. Data interconnect fabrics often provide for components to be addressable within the fabric, and employ packet-based communications to improve efficiency. However, such systems frequently suffer from communications delay due to communication buffer overflows and data traffic congestion.

One existing solution to such problems is to use an on-off signaling in which an "off" signal applies back pressure to stop transmission of more packets of flits (flow control units) when the number of buffers drops below a threshold. However, such solutions often suffer from excessive latency due to waiting for on-off signaling.

Another existing solution is to use a credit-based mechanism in which one end of a link sends flow control credits to the other end, which allow packets or flits to be transmitted. Flow control credits are useful where the width of packets/flits stay constant over the course of transmission from original source to destination.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data interconnect system includes a first interconnect circuit and a first interconnect link coupled to the first interconnect circuit and having a first parallel link width. A second interconnect circuit is coupled to a second interconnect link having a second parallel link width different from the first parallel link width. A serializer/deserializer is coupled to the first and second interconnect links and converts data traffic from the first parallel link width to the second parallel link width. The serializer/deserializer includes a flow control credit converter circuit which receives a first flow control credit indicator on the second interconnect link, and produces a second flow control credit indicator on the first interconnect link based on the first flow control credit indicator and a variable flow control credit exchange rate (R) associated with the first and second interconnect links.

A method includes receiving data traffic over a first interconnect link of an on-chip interconnect fabric and converting the data traffic from a first parallel link width to a second parallel link width. The data traffic is transmitted over a second interconnect link of the on-chip interconnect fabric. A current value is calculated for a variable flow control credit exchange rate (R) associated with the first and second interconnect links. A first flow control credit indicator is received on the second interconnect link, and a credit amount is calculated based on the first flow control credit indicator and R. The second flow control credit indicator for the credit amount is transmitted on the first interconnect link.

A data processing system includes a first semiconductor chip including at least one processor and an interconnect fabric coupled to the at least one processor. The interconnect fabric includes a first interconnect circuit coupled to a first interconnect link having a first parallel link width, a second interconnect circuit coupled to a second interconnect link having a second parallel link width different from the first parallel link width, and a serializer/deserializer coupled to the first and second interconnect links which converts data traffic from the first parallel link width to the second parallel link width. The serializer/deserializer includes a flow control credit converter circuit which receives a first flow control credit indicator on the second interconnect link, and produces a second flow control credit indicator on the first interconnect link based on the first flow control credit indicator and a variable flow control credit exchange rate (R) associated with the first and second interconnect links.

Figure 1:
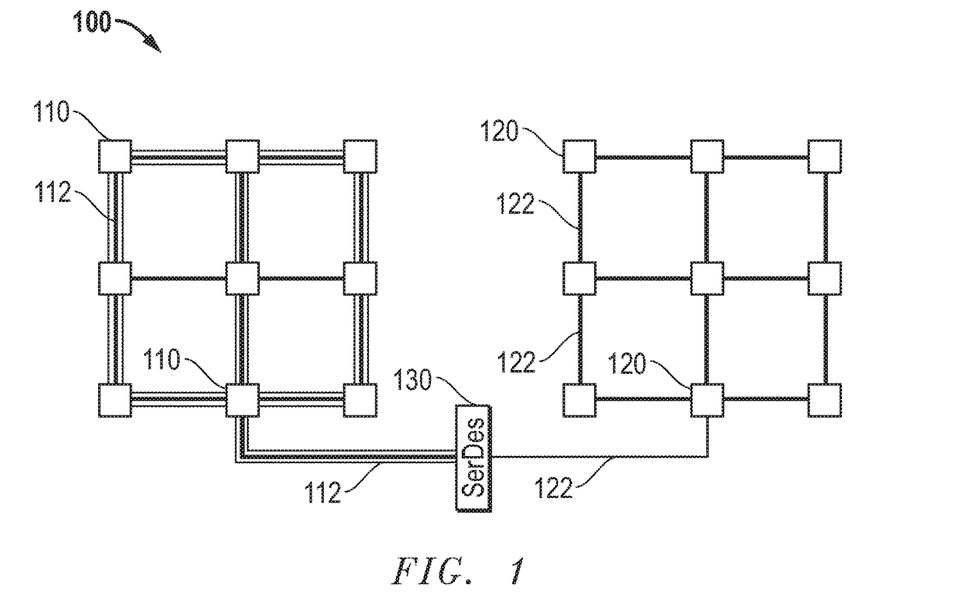
FIG. 1 illustrates in block diagram form an interconnect system including communication links of different widths according to some embodiments.

FIG. 1 illustrates in block diagram form an interconnect system 100 including communication links of different widths according to some embodiments. Interconnect system 100 is typically an on-chip data interconnect system, but may span more than one chip of a multi-chip module. A number of routers 110 are interconnected with interconnect links 112 having a first parallel link width such as 256 bits, for example. Each router may be connected to one or more processors, memory controllers, or other circuitry such as communication ports, which communicate over interconnect system 100 in an addressable fashion. Each router 110 typically includes an interconnect circuit for each interconnect link 112 to which it connects, including drivers, receivers, buffers, and other associated circuitry. A switch connected to each interconnect circuit directs communications along their designated route.

Also shown is a number of routers 120, interconnected with interconnect links 122 having a second parallel link width such as 64 bits, for example. Routers 120 similarly include interconnect circuitry for each interconnect link 122, and direct traffic to addressable endpoints which may be connected to any of the routers 110 or 120.

For traffic from routers 110 to be directed to routers 120, and vice versa, the link width must be adjusted. This is accomplished with a serializer/deserializer 130 ("SerDes") connected to one of the interconnect links 112 and to one of the interconnect links 122. SerDes 130 converts data traffic from the first parallel link width to the second parallel link width for traffic from interconnect link 112 to interconnect link 122, and performs the opposite conversion for traffic passing the other direction.

In this embodiment, the traffic is typically formed in addressable packets. In other embodiments, the system can support non-packet based traffic. To transmit the packets, they are broken at the link level into flow control units (flits) that are transmitted over the parallel data lines of the relevant interconnect link. A flit is often the same size (in transmitted bits) as the "phit" size of the link, which is the amount of data transmitted in a single cycle. Flow control credits are used to regulate transmission over the interconnect links 112 and 122 to avoid problems such as congestion and buffer overflow.

Figure 2:
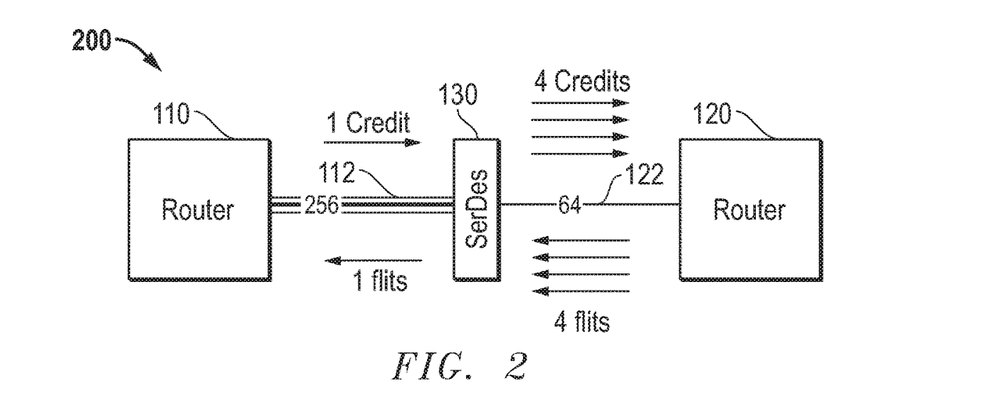
FIG. 2 shows in block diagram form a portion of the system of FIG. 1, annotated to show exchange of data and flow control credits according to one embodiment.

FIG. 2 shows in block diagram form a portion 200 of the system of FIG. 1, annotated to show exchange of data and flow control credits according to one embodiment. SerDes 130 is shown connected to interconnect link 112, which is 256 bits wide, and interconnect link 122, which is 64 bits wide. Routers 110 and 120 are shown connected to opposite ends of the respective interconnect links. Only a single relevant interconnect link is shown for each router. Because of the different link widths of interconnect links 112 and 122, a different flit size is used for each link. In this embodiment the flit size for each link is the link width, 64 bits for interconnect link 122 and 256 bits for interconnect link 112. As can be understood by the examples below, the different link widths with their corresponding flit sizes often require a different number of flits to transmit the same data on a different link. A different number of flow control credits may be required as well.

For example, as shown in the annotations, router 120 transmits 4 flits over the narrower interconnect link 122. SerDes 130 receives the 4 flits and combines them into a single 256-bit wide flit which is transmitted to the broader interconnect link 112 to router 110. When that 256-bit wide flit vacates router 110, a single flow control credit is sent back by router 110 by transmitting an appropriate indicator over interconnect link 112. However, this credit does not translate into one credit for router 120. Instead, the SerDes 130 converts the one credit into four credits, which are transmitted from SerDes 130 to router 120. Thus, a multiplication factor or exchange rate of 4 is used to create the four depicted credits transmitted from SerDes 130 to router 120. This exchange rate may vary in different scenarios, and so a more adaptable solution is required to reliably exchange flow control credits between router 110 and router 120.

Figure 3:
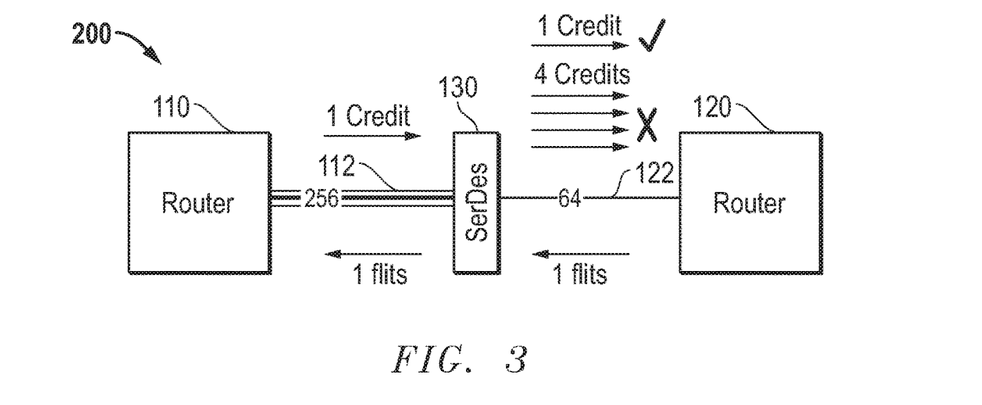
FIG. 3 shows in block diagram form the same partial system of FIG. 2, with another transmission scenario annotated on the diagram.

FIG. 3 shows in block diagram form the same portion 200 of the system of FIG. 1, with another transmission scenario annotated on the diagram. This scenario illustrates an exchange where a simple, constant exchange rate would result in flow control problems. As shown in the annotations, router 120 sends a single 64-bit wide flit over interconnect link 122. Since this is a single flit message, with no more flits transmitted to combine when sending on the wider interconnect link 112, the SerDes unit broadens the flit to a 256-bit wide flit and transmits it to router 110. However, the depicted one credit sent from router 110 does not cause SerDes 130 to send four credits to router 120 in this case, as shown by the four credits with an X representing an incorrect credit amount. Instead, the correct amount of credits to send over interconnect link 122 to router 120 is one credit as shown, because only one 64-bit flit was sent originally by router 120. If four flow control credits were sent, router 120 would accumulate excess credits which may cause flow control problems by overloading the input buffer of router 110 when transmitting excess flits allowed by the excess credits. Using an exchange rate of 1 to 1 provides a credit back to router 120 and provides an accurate credit accounting for this scenario. As can be understood from the examples of FIG. 2 and FIG. 3, transmitting two or three flits from router 120 requires yet another exchange rate to be provided at SerDes 130.

Figure 4:
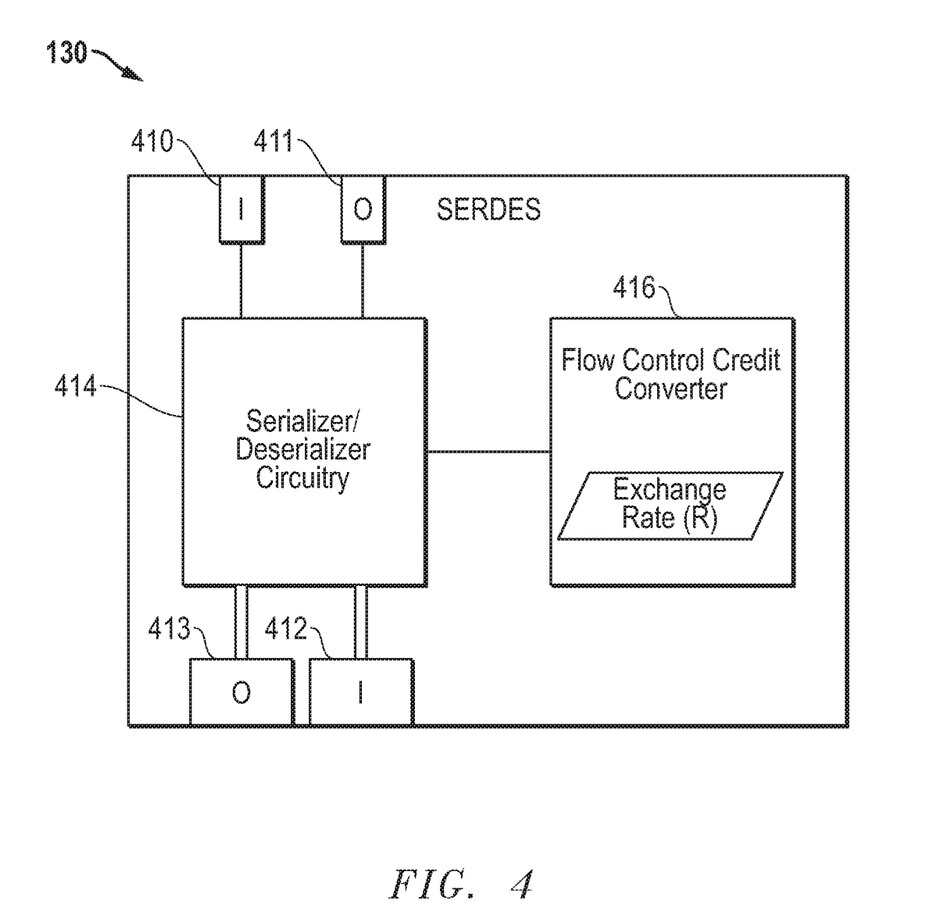
FIG. 4 shows in block diagram form a serializer/deserializer according to some embodiments.

FIG. 4 shows in block diagram form a SerDes 130 according to some embodiments. SerDes 130 generally includes serializer/deserializer circuitry 414 and a flow control credit converter circuit 416 ("converter circuit 416"). SerDes 130 includes input and output terminals 410 and 411 for connecting to a narrower link such as interconnect link 122 of FIG. 2, and input and output terminals 412 and 413 for connecting to a wider link such as interconnect link 112. SerDes 130 is typically a full duplex SerDes and connects to dedicated unidirectional interconnect links on terminals 410-413. Bidirectional interconnect links may also be used in some embodiments. Serializer/deserializer circuitry 414 is connected to input/output terminals 410-413, and is constructed according to known techniques using elements such as flip flops, latches, and multiplexers.

In operation, serializer/deserializer circuitry 414 serializes and deserializes the digital data traffic received over input terminals 410 and 412, and provides the resulting serialized or deserialized data over the respective output terminals 411 and 413. Flow control credits are not directly passed through, but instead are converted by converter circuit 416 and the new value injected into the output of serializer/deserializer circuitry 414.

Converter circuit 416 is connected to the serializer/deserializer such that it can receive indicators for flow control credits that arrive on input terminals 410 and 412. Rather than simply passing such credit indicators through serializer/deserializer circuitry 414, converter circuit 416 replaces the received flow control credit indicator with a second flow control credit indicator based on received flow control credit indicator and a variable flow control credit exchange rate (R) associated with the interconnect links. Converter circuit 416 includes digital logic for calculating the amount of new credits according to the exchange rate, for updating the exchange rate, and for replacing the credit indicator with a new credit indicator that is transmitted on the relevant interconnect link. An example of these processes is given with regard to FIG. 5 and FIG. 6. The converter circuit 416 can be implemented using any suitable type of hardware data structure such as a finite state machine (FSM) or lookup table, because for any given pair of interconnect link widths, there are a finite set of exchange rates possible.

Figure 5:
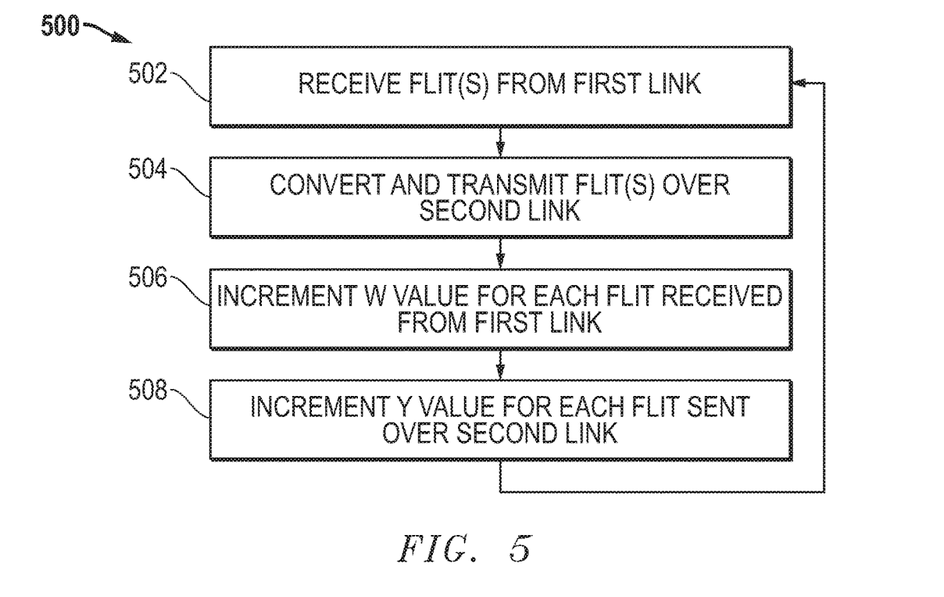
FIG. 5 shows in flow diagram form a process for transmitting traffic over a SerDes according to some embodiments.

FIG. 5 shows in flow diagram form a process 500 for transmitting traffic over a SerDes according to some embodiments. Process 500 is typically performed by a SerDes circuit including a converter circuit 416, and is performed in conjunction with the process of FIG. 6 to convert flow control credits. At block 502, process 500 includes receiving data traffic over a first interconnect link of an on-chip interconnect fabric. The traffic is generally structured in flits as described above. Block 504 includes converting the data traffic from a first parallel link width to a second parallel link width, and transmitting the data traffic in flits over a second interconnect link. It is noted that in this example the "first link" has the smaller width, for example interconnect link 122 of FIG. 2, and the second link has the larger width, for example interconnect link 112.

Next, process 500 updates variables used to calculate the flow control credit exchange rate. The use of these variables is described with regard to FIG. 6. Block 506 updates a value W, which is used to count flits received on the first interconnect link, by incrementing W for each flit received on the first interconnect link. Block 508 updates a value Y, which is used to count flits sent on the second interconnect link, by incrementing Y for each flit sent over the second interconnect link.

As depicted, process 500 then goes to block 502 to wait for the next flit(s) received over the first interconnect link, where it repeats the steps. It is noted that while the depicted steps are shown in order, they may actually be performed asynchronously. For example, the values of W and Y may be incremented immediately upon receipt and transmission of the relevant flits of data by separate digital logic than that controlling the data transmission.

Figure 6:
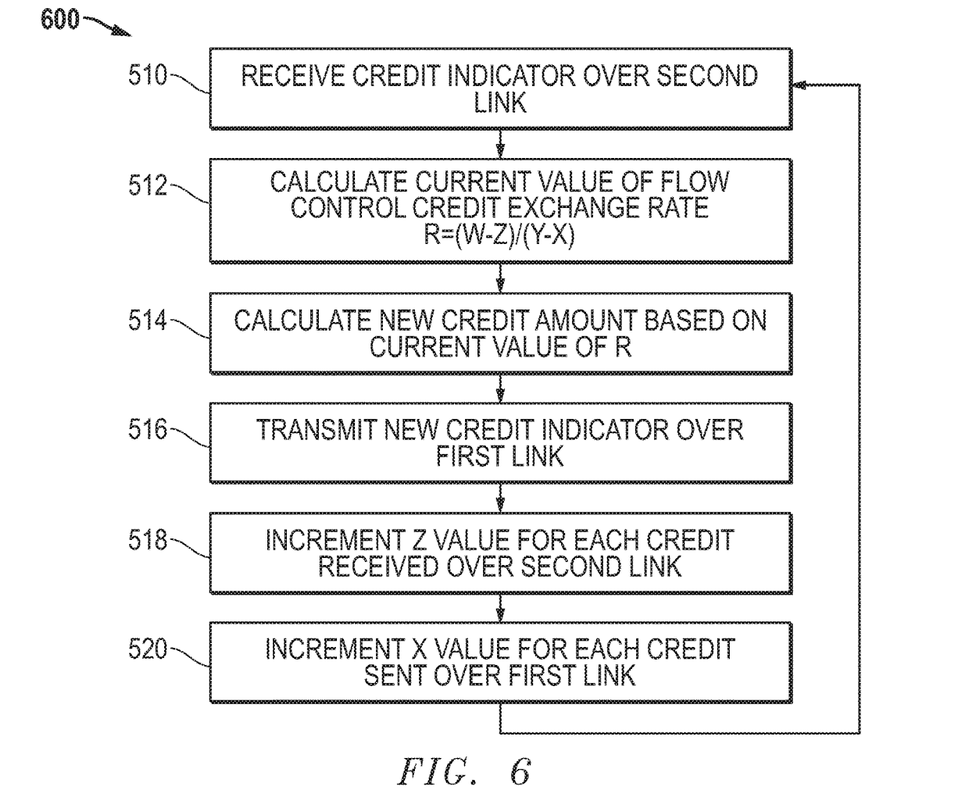
FIG. 6 shows in flow diagram form a related process to that of FIG. 5 for converting flow control credits according to some embodiments.

FIG. 6 shows in flow diagram form a related process 600 for converting flow control credits according to some embodiments. Process 600 is performed by digital logic in SerDes 130, and manages the flow control credits sent and received from SerDes 130 while process 500 executes to manage data traffic through SerDes 130. The depicted blocks do not necessarily occur in order as they are typically performed asynchronously unless the results of one block are required for another block. Process 600 starts at block 510 with the receipt of a flow control credit indicator over the second interconnect link (the wider link).

Block 512 calculates a current value for the variable flow control credit exchange rate (R) associated with the first and second interconnect links. Calculating the current value for R in this embodiment is based on a number of flow control units (flits) received on the first interconnect link (W), a number of credits sent on the first interconnect link (X), a number of flits sent on the second interconnect link (Y), and a number of credits received the second interconnect link (Z). R is calculated according to the equation $R=(W-Z)/(Y-X)$. When R does not evaluate to a whole number, the closest integer lower than the evaluation may be chosen as the exchange rate (in the present example of traffic going from narrow to broad link width). This ensures that, for a series of consecutive credits, the variable exchange rate will eventually convert into a whole integer. When the denominator of the expression for R is zero, the process evaluates R to a defined maximum value. The defined maximum value is preferably set to the ratio of the link sizes, or the wide link size divided by the narrow link size. In the example of FIG. 2, this evaluates to 256 bits/64 bits=4. The variable flow control credit exchange rate is calculated differently for traffic going from a wider link to a narrower link. In such case, the expression for R is inverted in order to allow rounding down of a number that varies between zero and the link width ratio. After rounding down, the value of R is inverted to provide the applied exchange rate as a fraction, which is generally reduces the number credits received from a narrower link to be passed on to the wider link.

Block 514 calculates a new credit amount with which to replace the credits received at block 510, based on the number of credits received and the current value of R. In this example the calculation multiplies the credits received by R to find the new credit amount. Block 516 then transmits a second flow control credit indicator for the new credit amount on the first interconnect link.

The value of Z, the number of credits received the second interconnect link, is updated at block 518 to count the credits received at block 510. The value of X, the number of credits sent on the first interconnect link, is updated at block 520 to count credits transmitted at block 516. Then process 600 returns to block 510 where it waits to receive another flow control credit indicator over the second link.

It is noted that in this version the value of the variable flow control credits exchange rate R is updated after receiving a credit indicator over the second link as shown at block 510, but in other embodiments the update calculation may be done in response to other events. For example, an update may be calculated any time one of the variables W, X, Y, or Z is updated. An update may also be calculated in response to event such as sending a flit on the second interconnect link.

The example processes of FIG. 5 and FIG. 6 include calculating a variable flow control credit exchange rate for traffic flowing in a single direction through a sequence of interconnect links which change in link width. For links in which multiple flow control buffers are used for multiple corresponding virtual channels, SerDes 130 may calculate a separate variable flow control credit exchange rate for each of the virtual channels. It is also noted that the example exchange rate calculations of FIG. 6 are given for data traffic flowing from the narrower interconnect link to the wider interconnect link, with credits converted from the wider link to the narrower link. SerDes 130 calculates a separate variable flow control credit exchange rate for traffic moving in the opposite direction.

Figure 7:
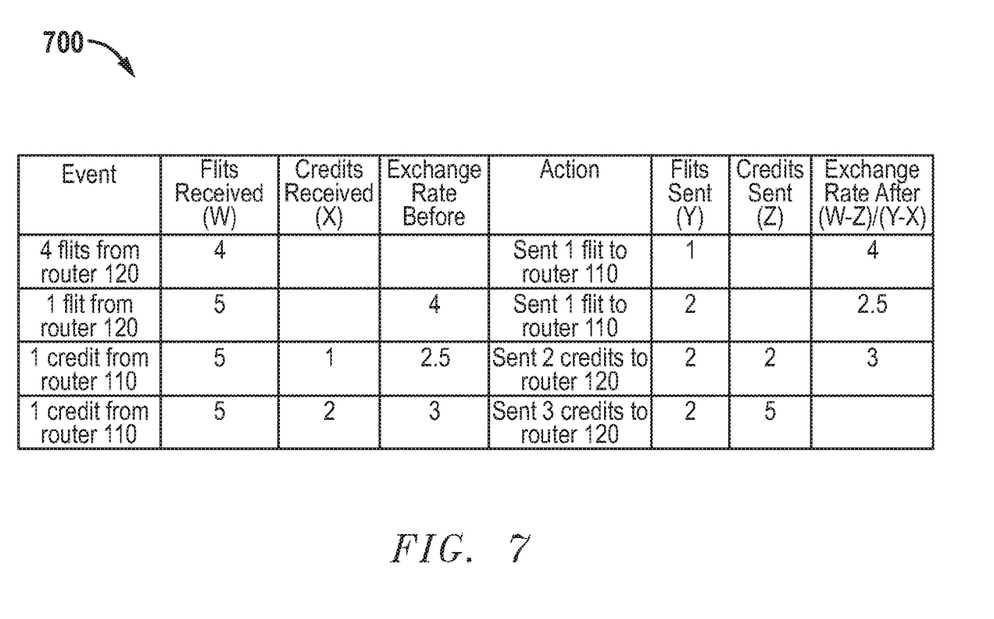
FIG. 7 shows in table form a sequence of events exemplifying operation of the processes of FIG. 5 and FIG. 6.

FIG. 7 shows in table form a sequence of events exemplifying operation of the processes of FIG. 5 and FIG. 6. The first row of table 700 contains column headings, and each following row lists the characteristics of events that happen in order. The events listed in the table 700 set forth an example scenario showing how the variable flow control credit exchange rate R varies as data and flow control credits are sent and received at SerDes 130 in the example system shown in FIG. 2 and FIG. 3.

The event of the first row is four flits being transmitted from router 120 to SerDes 130. In response, the W variable to show four flits received, and combines the flits into a single larger flit which is transmitted to router 110. No credits have yet been received so the X variable has no value or zero. The Y variable is updated to show one flit sent. No credits have yet been sent, so the Z variable has no value or zero. At this point the exchange rate R evaluates to 4.

The event of the second row is a single flit sent from router 120 to SerDes 130. The W variable is updated to show five flits received. At this event, the X variable still has no value because no credits have been received yet. The exchange rate before the event is 4. The action taken in response to the event is to format the single flit received as a larger flit and transmit it to router 110. The Y variable is then updated to show 2 total flits transmitted. Applying the new variable values, the exchange rate R evaluates to 2.5 after this event, which would be rounded down to 2 as discussed above to be applied in a credit exchange.

The event in the third row is a single credit received from router 110. In response, the X variable is updated to show one credit received. The current value of exchange rate R at 2.5 is rounded down to 2 and multiplied by the single credit received to provide 2 credits that are sent to router 120. The Y variable remains at 2 because no data flits are sent. The Z variable is updated to 2 to reflect the 2 credits sent to router 120. Applying the new variable values, the exchange rate R evaluates to 3 after this event and the responsive actions are complete.

The final listed event in the fourth row is a single credit received from router 110. The W variable is not updated because no data flits were received. The X variable is updated to show two total credits received. The current value of exchange rate R of 3 is multiplied by the single credit received to provide 3 credits that are sent to router 120. The Y variable remains at 2 because no data flits are sent. The Z variable is updated to 5 to reflect the 3 additional credits sent to router 120. Applying the new variable values, the exchange rate R does not evaluate to a number because the numerator and denominator both evaluate to zero. In this condition, the exchange rate is set at the defined maximum value which is the ratio between the link widths.

It is noted that in the first row of table 700, the exchange rate calculation is initialized and there are no credits pending. In this condition the exchange rate also defaults to the ratio between the link widths, which is 4 in this example. As can be understood from the example sequence of events, the exchange rate peaks at 4 (which is the inherent exchange rate) and varies according to the flit transactions taking place.

Figure 8:
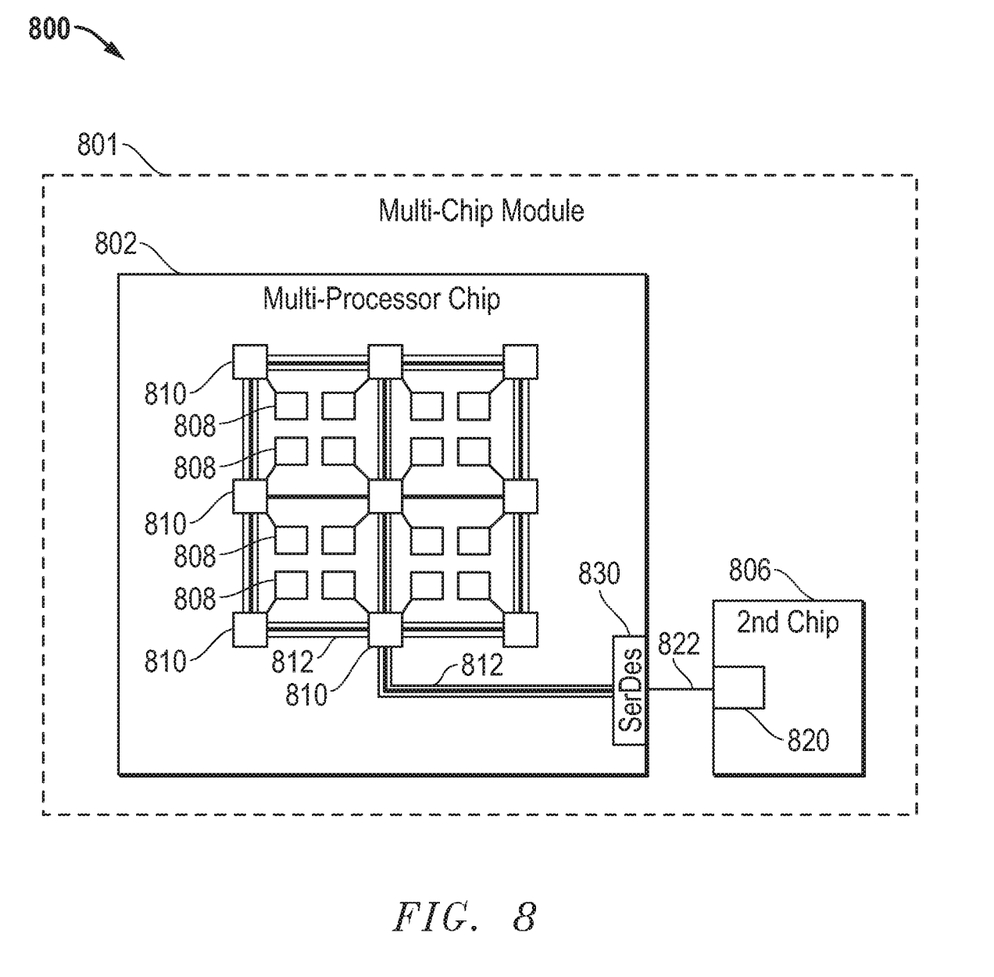
FIG. 8 illustrates in block diagram form an interconnect system connecting chips on a multi-chip-module according to some embodiments.

FIG. 8 illustrates in block diagram form an interconnect system 800 connecting chips on a multi-chip-module 801 according to some embodiments. Multi-chip module 801 includes a multi-processor chip 802 and at least a second chip 806, which are packaged and interconnected in a module typically with an interposer carrier.

Multi-processor chip 802 includes multiple routers 810 interconnected with respective interconnect links 812. Multiple processors 808 are connected to respective routers 810 and are addressable on interconnect system 800 by other processors 808 and other connected components. Interconnect system 800 also includes a serializer/deserializer (SerDes) 830 connected to one of the routers 810 with an interconnect link 812. SerDes 830 is also connected to an off-chip interconnect link 822.

In this embodiment, SerDes 830 links to an endpoint 820 on a second chip 806 through off-chip interconnect link 822. Endpoint 820 is also addressable on interconnect system 800. Interconnect link 822 has different width than interconnect link 812, in this case a smaller width. SerDes 830 is preferably constructed like that of FIG. 4, and performs flow control credit conversion according to the processes of FIG. 5 and FIG. 6. While, in this embodiment, interconnect link 822 connects SerDes 830 to an endpoint, other embodiments may instead connect to a router on chip 806. Endpoint 820 may be any suitable communications endpoint such as a processor, graphics processor, memory controller, or network node, for example.

The techniques herein can be extended to any kind of interconnect using a credit-based flow control with links of different width. The techniques provide an efficient back pressure mechanism in such interconnect system to ensure that network packets are not dropped while having low latency. The techniques herein also provide a way to implement credit-based backpressure flow control in interconnect systems where network packets can cross width boundaries, such as in multi-chip module architectures. The exchange rate calculation is preferably contained in the SerDes unit, and requires no changes to routers or endpoints on either side of the SerDes. The exchange rate calculation also preferably requires no data from other elements of the system, and instead is based on the ratio of link widths and characteristics of traffic through the SerDes.

Data interconnect system 100 of FIG. 1 or any portion thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, credits may be applied at the packet level or the phit level, rather than the flit level. Other equations for calculating the flow control credit exchange rate may be used.

Accordingly, it is intended by the appended claims to cover all modifications of the disclosed embodiments that fall within the scope of the disclosed embodiments.

What is claimed is:

1. A data interconnect system, comprising:
a first interconnect circuit;
a first interconnect link coupled to the first interconnect circuit and having a first parallel link width;
a second interconnect circuit;
a second interconnect link coupled to the second interconnect circuit and having a second parallel link width different from the first parallel link width; and
a serializer/deserializer coupled to the first and second interconnect links which converts data traffic from the first parallel link width to the second parallel link width, the serializer/deserializer including a flow control credit converter circuit which receives a first flow control credit indicator on the second interconnect link, and produces a second flow control credit indicator on the first interconnect link based on the first flow control credit indicator and a variable flow control credit exchange rate (R), which varies as data and flow control credits are sent and received, associated with the first and second interconnect links.

2. The data interconnect system of claim 1, wherein the flow control credit converter circuit further calculates a current value for the variable flow control credit exchange rate based on a number of flow control units (flits) received from the first interconnect circuit (W), a number of credits sent to the first interconnect circuit (X), a number of flits sent to the second interconnect circuit (Y), and a number of credits received from the second interconnect circuit (Z).

3. The data interconnect system of claim 2, wherein the flow control credit converter circuit calculates the current value for R according to the equation $R=(W-Z)/(Y-X)$.

4. The data interconnect system of claim 1, wherein the flow control credit converter circuit further calculates a current value for R in response to a flit being sent from the serializer/deserializer to the second interconnect circuit.

5. The data interconnect system of claim 1, wherein the first interconnect circuit is part of a first interconnect router of a data interconnect fabric on a semiconductor chip.

6. The data interconnect system of claim 5, wherein the second interconnect circuit is part of a second interconnect router of the data interconnect fabric.

7. The data interconnect system of claim 1, wherein the second interconnect link is an on-chip link and the first interconnect link connects two semiconductor chips.

8. A method comprising:
receiving data traffic over a first interconnect link of an on-chip interconnect fabric;
converting the data traffic from a first parallel link width to a second parallel link width;
transmitting the data traffic over a second interconnect link of the on-chip interconnect fabric;
calculating a current value for a variable flow control credit exchange rate (R), which varies as data and flow control credits are sent and received, associated with the first and second interconnect links;
receiving a first flow control credit indicator on the second interconnect link, and calculate a credit amount based on the first flow control credit indicator and R; and
transmit a second flow control credit indicator for the credit amount on the first interconnect link.

9. The method of claim 8, wherein calculating the current value for R is based on a number of flow control units (flits) received on the first interconnect link (W), a number of credits sent on the first interconnect link (X), a number of flits sent on the second interconnect link (Y), and a number of credits received the second interconnect link (Z).

10. The method of claim 9, wherein calculating the current value for R is done according to the equation $R=(W-Z)/(Y-X)$.

11. The method of claim 8, wherein calculating the current value for R is done in response to sending a flit on the second interconnect link.

12. The method of claim 8, further comprising calculating a separate variable flow control credit exchange rate for each of a plurality of virtual channels associated with the first and second interconnect links.

13. The method of claim 8, wherein the first interconnect link connected to an interconnect router of the on-chip interconnect fabric.

14. The method of claim 8, wherein the second interconnect link is connected to an interconnect router of the on-chip interconnect fabric.

15. A data processing system comprising:
at least one processor; and
an interconnect fabric coupled to the at least one processor and including a first interconnect circuit coupled to a first interconnect link having a first parallel link width, a second interconnect circuit coupled to a second interconnect link having a second parallel link width different from the first parallel link width, and a serializer/deserializer coupled to the first and second interconnect links which converts data traffic from the first parallel link width to the second parallel link width, the serializer/deserializer including a flow control credit converter circuit which receives a first flow control credit indicator on the second interconnect link, and produces a second flow control credit indicator on the first interconnect link based on the first flow control credit indicator and a variable flow control credit exchange rate (R), which varies as data and flow control credits are sent and received, associated with the first and second interconnect links.

16. The data processing system of claim 15, wherein the flow control credit converter circuit further calculates a current value for the variable flow control credit exchange rate based on a number of flow control units (flits) received from the first interconnect circuit (W), a number of credits sent to the first interconnect circuit (X), a number of flits sent to the second interconnect circuit (Y), and a number of credits received from the second interconnect circuit (Z).

17. The data processing system of claim 16, wherein the flow control credit converter circuit calculates the current value for R according to the equation $R=(W-Z)/(Y-X)$.

18. The data processing system of claim 16, wherein the flow control credit converter circuit further calculates the current value for R in response to a flow control unit (flit) being sent from the serializer/deserializer to the second interconnect circuit.

19. The data processing system of claim 15, wherein the at least one processor and the data interconnect fabric are part of a first semiconductor chip.

20. The data processing system of claim 19, wherein the at least one processor is part of a first semiconductor chip, and wherein the first interconnect circuit is located on a second semiconductor chip in a multi-chip module with the first semiconductor chip, the first interconnect link coupling the serializer/deserializer to the second semiconductor chip.

* * * * *